United States Patent
Inoue et al.

(10) Patent No.: US 7,709,151 B2
(45) Date of Patent: May 4, 2010

(54) NON-AQUEOUS ELECTROLYTE SECONDARY BATTERY, POSITIVE ELECTRODE ACTIVE MATERIAL AND METHOD OF MANUFACTURING THE SAME

(75) Inventors: Takao Inoue, Kobe (JP); Masahisa Fujimoto, Osaka (JP); Masaharu Itaya, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/205,270

(22) Filed: Sep. 5, 2008

(65) Prior Publication Data

US 2009/0011336 A1 Jan. 8, 2009

Related U.S. Application Data

(62) Division of application No. 10/801,655, filed on Mar. 17, 2004, now abandoned.

(30) Foreign Application Priority Data

Mar. 25, 2003 (JP) .............................. 2003-082305

(51) Int. Cl.
  *H01M 4/26* (2006.01)
(52) U.S. Cl. .............................. 429/231.95; 429/231.6
(58) Field of Classification Search ............ 429/231.95, 429/218.1, 188, 306, 231.3, 231.6; 423/594.4, 423/594.6, 599
See application file for complete search history.

(56) References Cited

U.S. PATENT DOCUMENTS 5,591,543 A * 1/1997 Peled et al. ................. 429/312

6,171,723 B1 1/2001 Loch et al.
2003/0013017 A1 1/2003 Nagayama et al.

FOREIGN PATENT DOCUMENTS

JP        10-241691       9/1998

(Continued)

OTHER PUBLICATIONS

Japanese Office Action, with English Translation, issued in Japanese Patent Application No. JP2003-082305 dated on Jun. 24, 2008.

*Primary Examiner*—Patrick Ryan
*Assistant Examiner*—Monique Wills
(74) *Attorney, Agent, or Firm*—McDermott Will & Emery LLP

(57) ABSTRACT

As a positive electrode active material, a lithium transition metal complex oxide having a layered rock-salt structure containing lithium (Li) and containing magnesium atoms (Mg) substituted for part of lithium atoms (Li) is used. The lithium transition metal complex oxide is formed by chemical or electrochemical substitution of Mg atoms for part of Li atoms in $LiCoO_2$, $LiMnO_2$, $LiFeO_2$, $LiNiO_2$, or the like. A cell is prepared in which a negative electrode 2 and a positive electrode 1 including the lithium transition metal complex oxide (positive electrode active material) are disposed in a non-aqueous electrolyte 5 including a lithium salt, and part of Li in the lithium transition metal complex oxide is extracted by discharging the cell. Then, the electrolyte including Li is replaced with an electrolyte including Mg, and the cell is discharged, so that Mg atoms are substituted for the part of Li atoms in the lithium transition metal complex oxide.

3 Claims, 4 Drawing Sheets

FOREIGN PATENT DOCUMENTS

| | | |
|---|---|---|
| JP | 2000-123834 A | 4/2000 |
| JP | 2000-348724 | 12/2000 |
| JP | 2001-110413 | 4/2001 |
| JP | 2001-155729 A | 6/2001 |
| JP | 2001-243951 A | 9/2001 |
| JP | 2001-256975 | 9/2001 |
| JP | 2003-208895 | 7/2003 |
| JP | 2003-346797 | 12/2003 |
| WO | WO 02/054511 A1 | 7/2002 |

* cited by examiner

F I G. 1
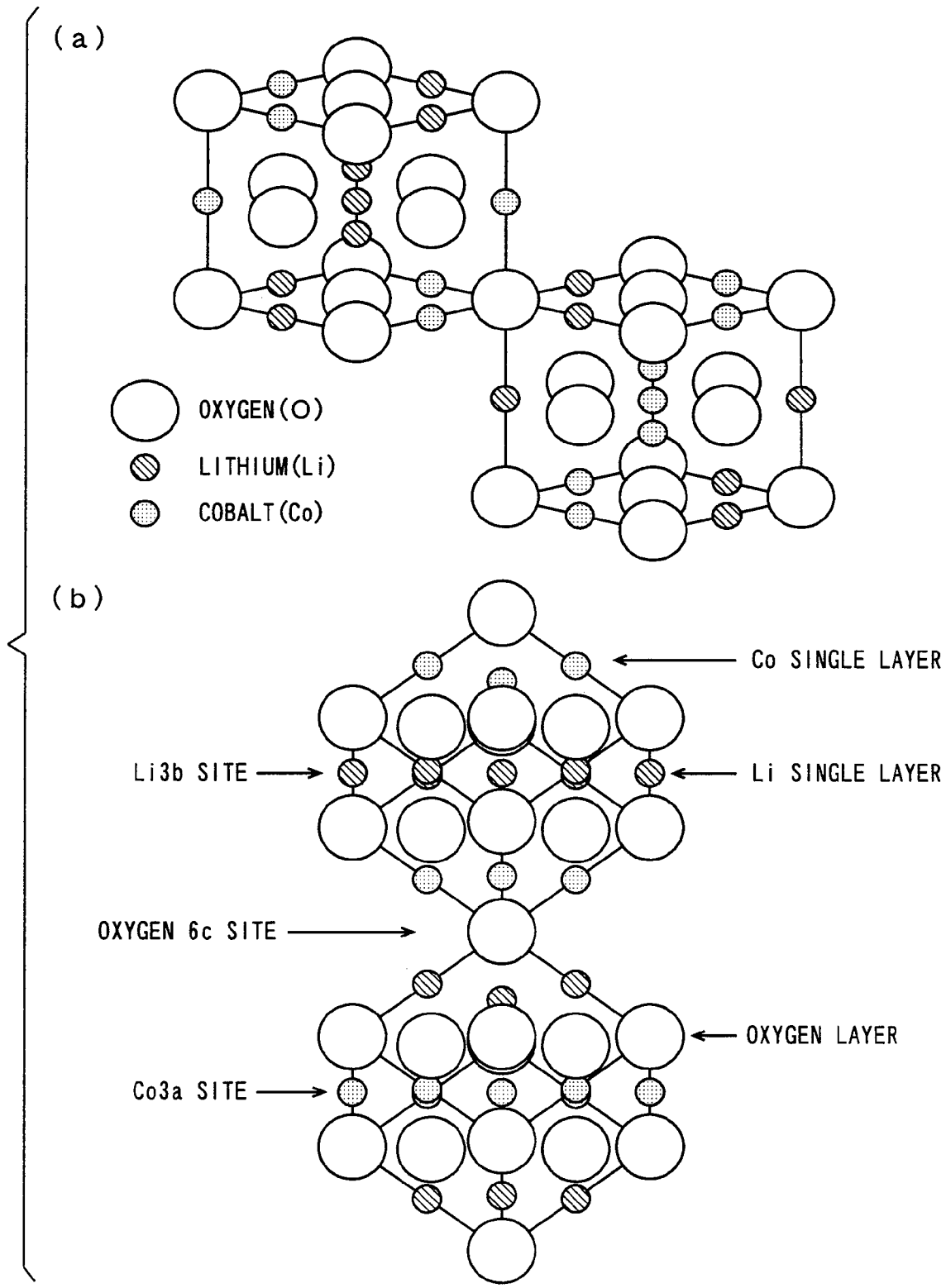

F I G. 2
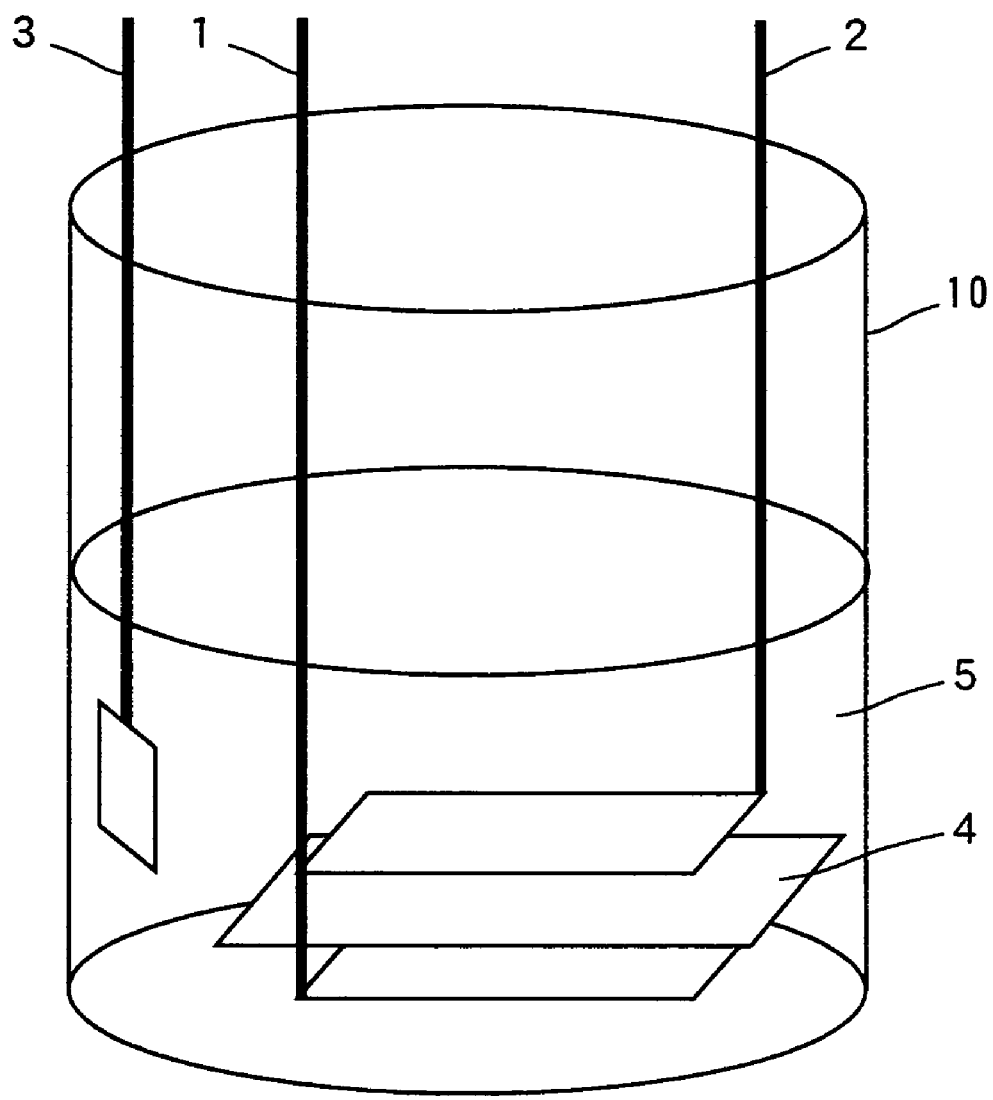

NON-AQUEOUS ELECTROLYTE SECONDARY BATTERY, POSITIVE ELECTRODE ACTIVE MATERIAL AND METHOD OF MANUFACTURING THE SAME

RELATED APPLICATIONS

This application is a Divisional of U.S. application Ser. No. 10/801,655, filed Mar. 17, 2004 now abandoned, claiming priority of Japanese Application No. 2003-082305, filed Mar. 25, 2003, the entire contents of each of which are hereby incorporated by reference.

BACKGROUND OF THE INVENTION

1. Field of the Invention

The present invention relates to a non-aqueous electrolyte secondary battery, positive electrode active material, and method of manufacturing the same.

2. Description of the Background Art

Metal oxides having a layered rock-salt structure, such as lithium cobaltate, are currently used as high-voltage positive electrode active materials for lithium-ion batteries. However, since metal oxides have a capacity as low as 124 to 150 mAh/g, techniques for higher-capacity are underdevelopment, and intensive research on substitution materials is being carried out (refer to, for example, JP-2001-243951-A and JP-2001-155729-A).

Lithium cobaltate has a theoretical capacity approximately as high as 274 mAh/g. However, 55% of the theoretical capacity, which is approximately 150 mAh/g, is said to be the limitation of its use as positive electrode active material at present. For this reason, it is desired that the capacity of lithium cobaltate be increased.

SUMMARY OF THE INVENTION

An object of the present invention is to provide a non-aqueous electrolyte secondary battery having improved capacity, a positive electrode active material capable of improving the capacity, and method of manufacturing the same.

Another object of the present invention is to provide a positive electrode active material capable of improving the capacity of a non-aqueous electrolyte secondary battery.

Still another object of the present invention is to provide a method of manufacturing a positive electrode active material capable of improving the capacity of a non-aqueous electrolyte secondary battery.

In the case where lithium cobaltate is expressed by $Li_{1-x}CoO_2$, and belongs to a hexagonal system, the length of the a-axis tends to shrink when x is less than approximately 0.5, and tends to extend when x is not less than that value. On the other hand, the length of the c-axis tends to extend when x is less than approximately 0.6, and tends to shrink when x is not less than that value, to be shorter than that of the starting material when x is 0. In other words, the lattice volume of lithium cobaltate expands along with charge when x is less than 0.6, and shrinks when x is not less than 0.6. The phase transition, as expressed in the following formula, occurs in a region almost intermediate (x=0.45 to 0.55) in a region of $0.25 \leq x<0.75$. The substantial capacity of lithium cobaltate is determined on the basis of this region as a boundary.

Such a structural change in lithium colbaltate is probably attributed to increased structural instability caused by release of excessive lithium positioned in a 3b site of the layered rock-salt structure.

The present inventors focused on this structural change in lithium cobaltate, and as a result of experiment and examination wholeheartedly performed by the inventors, it was found out that a stabilized structure can be realized by substitution of magnesium for part of a 3b site (lithium) in the layered rock-salt structure, leading to the following invention.

A non-aqueous electrolyte secondary battery according to one aspect of the present invention comprises a negative electrode; a positive electrode including a positive electrode active material capable of storage and release of lithium; and a non-aqueous electrolyte, wherein the positive electrode active material has a rock-salt structure containing lithium and is composed of an oxide containing magnesium substituted for part of lithium.

When magnesium is positioned in an octahedral 3b site in the layered rock-salt structure, the ion has a radius of 0.86 Å, which is similar to the radius of an ion of 0.90 Å when lithium is positioned in an octahedral 3b site. Therefore, the layered rock-salt structure is stabilized by substitution of magnesium in an octahedral 3b site. In this manner, an oxide in which a phase change hardly occurs on insertion and release of excessive lithium can be realized. As a result, the capacity of an oxide can be increased, leading to improved capacity of a non-aqueous secondary battery.

The oxide may a lithium transition metal complex oxide expressed by a composition formula of $Li_aMg_bM1O_2$, where a+2b=1, 0<a<1, and 0<b<0.5, and where M1 is a metal of at least one type selected from the group consisting of cobalt, manganese, iron and nickel. In particular, $0.5 \leq a<1$ and $0<b \leq 0.25$ are preferable. This allows sufficiently increased capacity of a lithium transition metal complex oxide.

The oxide may be a lithium transition metal complex oxide expressed by a composition formula of $Li_aMg_bCoO_2$, where a+2b=1, 0<a<1, and 0<b<0.5. In particular, $0.5 \leq a<1$ and $0<b \leq 0.25$ are preferable. This allows sufficiently increased capacity of lithium cobaltate.

The magnesium may be electrochemically substituted for the part of lithium in the oxide. Alternatively, the magnesium may be chemically substituted for the part of lithium in the oxide.

The magnesium may be electrochemically substituted for the part of lithium in the oxide using a non-aqueous electrolyte including an imide salt or a sulfonate in which a cation is magnesium. In particular, the magnesium may be electrochemically substituted for the part of lithium in the oxide using a non-aqueous electrolyte including a sulfonyl imide salt in which a cation is magnesium.

A positive electrode active material capable of storage and release of lithium according to another aspect of the present invention has a layered rock-salt structure containing lithium and is composed of an oxide containing magnesium substituted for part of lithium.

In the positive electrode active material according to the present invention, the magnesium is substituted for part of an octahedral 3b site in the layered rock-salt structure, so that the layered rock-salt structure is stabilized. In this manner, an oxide in which a phase change hardly occurs on insertion and release of excessive lithium can be realized. As a result, the capacity of a positive electrode active material can be increased.

The oxide may a lithium transition metal complex oxide expressed by a composition formula of $Li_aMg_bM1O_2$, where a+2b=1, 0<a<1, and 0<b<0.5, and where M1 is a metal of at least one type selected from the group consisting of cobalt, manganese, iron and nickel. In particular, $0.5 \leq a < 1$ and $0 < b \leq 0.25$ are preferable. This allows sufficiently increased capacity of a lithium transition metal complex oxide.

The oxide may be a lithium transition metal complex oxide expressed by a composition formula of $Li_aMg_bCoO_2$, where $a+2b=1$, $0<a<1$, and $0<b<0.5$. In particular, $0.5 \leq a < 1$ and $0 < b \leq 0.25$ are preferable. This allows sufficiently increased capacity of lithium cobaltate.

The magnesium may be electrochemically substituted for the part of lithium in the oxide. Alternatively, the magnesium may be chemically substituted for the part of lithium in the oxide.

The magnesium may be electrochemically substituted for the part of lithium in the oxide using a non-aqueous electrolyte including an imide salt or a sulfonate in which a cation is magnesium. In particular, the magnesium may be electrochemically substituted for the part of lithium in the oxide using a non-aqueous electrolyte including a sulfonyl imide salt in which a cation is magnesium.

A method of manufacturing a positive electrode active material according to still another aspect of the present invention comprises the step of electrochemically substituting magnesium for part of lithium in an oxide having a layered rock-salt structure containing lithium.

In the method of manufacturing the positive electrode active material according to the present invention, magnesium is substituted for the part of lithium in an octahedral 3b site in the layered rock-salt structure, so that the layered rock-salt structure is stabilized. In this manner, an oxide in which a phase change hardly occurs on insertion and release of excessive lithium can be realized. As a result, the capacity of an oxide can be increased.

The step of substituting may include the steps of preparing a cell in which a negative electrode and a positive electrode including the oxide are disposed in a non-aqueous electrolyte including a lithium salt (electrolyte salt); extracting the part of lithium in the oxide by charging the cell; after extracting the part of lithium in the oxide, replacing the non-aqueous electrolyte including a lithium salt (electrolyte salt) with a non-aqueous electrolyte including a magnesium salt (electrolyte salt); and after the replacement of non-aqueous electrolyte, inserting magnesium into the oxide by discharging the cell.

In this case, the replacement of non-aqueous electrolyte can facilitate the substitution of magnesium for the part of lithium in the oxide.

The oxide may include a lithium transition metal complex oxide, and the transition metal may include at least one type of metal selected from the group consisting of cobalt, manganese, iron, and nickel. The oxide may include lithium cobaltate.

The step of substituting may comprise the step of electrochemically substituting magnesium for the part of lithium in the oxide using a non-aqueous electrolyte including an imide salt or a sulfonate in which a cation is magnesium. In particular, the step of substituting may comprise the step of electrochemically substituting magnesium for the part of lithium in the oxide using a non-aqueous electrolyte including a sulfonyl imide salt in which a cation is magnesium. In this case, the substitution of magnesium for the part of lithium in the oxide can be facilitated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the layered rock-salt structure of $LiCoO_2$;

FIG. 2 is a diagram showing a test cell using lithium cobaltate containing magnesium atoms substituted for part of lithium atoms as a positive electrode active material;

DESCRIPTION OF THE PREFERRED EMBODIMENTS

Figure 3:
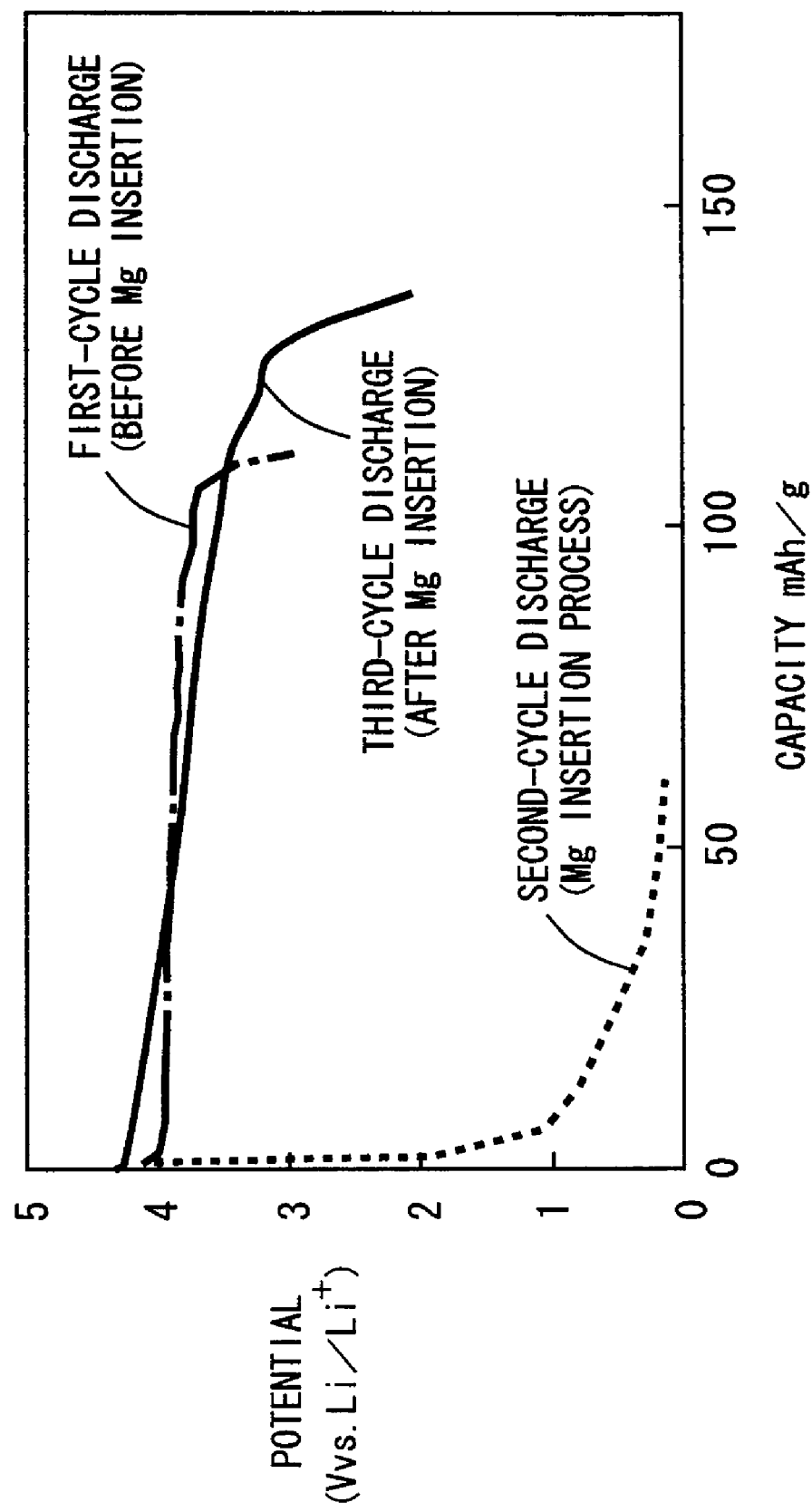
FIG. 3 is a diagram showing the measurement results of discharge curves of lithium cobaltate before and after substitution of magnesium atoms for lithium atoms.

Description will, hereinafter, be made of a non-aqueous electrolyte secondary battery according to a first embodiment of the present invention and method of manufacturing the same.

The non-aqueous electrolyte secondary battery according to the present embodiment comprises a negative electrode, a positive electrode, and a non-aqueous electrolyte.

As the negative electrode, carbon materials, such as graphite, lithium metal, lithium alloy, or the like capable of storage and release of lithium atoms (Li) may be used.

As the positive electrode active material, a lithium transition metal complex oxide having a layered rock-salt structure containing lithium and in which magnesium atoms (Mg) are substituted for part of lithium atoms is used. As the lithium transition metal complex oxide, $Li_aMg_bCoO_2$, $Li_aMg_bMnO_2$, $Li_aMg_bFeO_2$, $Li_aMg_bNiO_2$, and or like may be used. In these composition formulas, $a+2b=1$, $0<a<1$, and $0<b<0.5$. In particular, $0.5 \leq a < 1$ and $0 < b \leq 0.25$ are preferable, where approximately $a=0.8$ and $b=0.1$, for example. This allows sufficiently increased capacity of the lithium transition metal complex oxide.

The above-mentioned lithium transition metal complex oxide is formed by chemical or electrochemical substitution of magnesium atoms (Mg) for part of lithium atoms (Li) in $LiCoO_2$, $LiMnO_2$, $LiFeO_2$, $LiNiO_2$, or the like, as described later.

As a non-aqueous solvent (organic solvent) for the non-aqueous electrolyte, non-aqueous solvents (organic solvents) generally used in non-aqueous electrolyte secondary batteries may be used. At least one type selected from, for example, ethylene carbonate, diethyl carbonate, dimethyl carbonate, propylene carbonate, cyclic ether, chain ether, or carbonate fluoride may be used. As a lithium salt (electrolyte salt) to be added into the organic solvent, lithium salts (electrolyte salts) generally used for non-aqueous electrolyte secondary batteries may be used, and at least one selected from, for example, $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$, and $LiAsF_6$ may be used. It is noted that the types of non-aqueous electrolytes are not limited to those described herein, and various types of non-aqueous electrolytes for non-aqueous secondary batteries may be used.

FIG. 1 is a diagram showing the layered rock-salt structure of $LiCoO_2$: (a) in a cubic representation, and (b) in a hexagonal representation.

In FIG. 1, white circles represent oxygen atoms(O), halftone circles represent cobalt atoms(Co), and hatched circles represent lithium atoms (Li).

The layered rock-salt structure of $LiCoO_2$ has a basic skeleton in which oxygen atoms form a cubic closest packed arrangement having -A-B-C-stacked layers, where the numbers of anions and cations are equal, and where all spaces in octahedral oxygen are occupied with cations. Moreover, cobalt and lithium atoms individually form single layers in octahedral 3a sites and octahedral 3b sites between (111) oxygen layers, respectively, forming alternate stacked layers.

In the present embodiment, magnesium atoms are substituted for part of lithium atoms in octahedral 3b sites, so that the layered rock-salt structure is stabilized. In this manner, a lithium transition metal complex oxide in which a phase change hardly occurs on insertion and release of excessive lithium atoms can be realized.

Description will, hereinafter, be made of a method in which a positive electrode active material is formed by electrochemical substitution of magnesium atoms for part of lithium atoms in a lithium transition metal complex oxide.

First, a cell is prepared in which a negative electrode and a positive electrode including a lithium transition metal complex oxide (positive electrode active material) are disposed in a non-aqueous electrolyte including a lithium salt (electrolyte salt). Part of lithium atoms in the lithium transition metal complex oxide are then extracted by charging the cell. After that, the non-aqueous electrolyte including a lithium salt (electrolyte salt) is replaced with a non-aqueous electrolyte including a magnesium salt (electrolyte salt), and the cell is discharged. Consequently, magnesium atoms are substituted for the part of lithium atoms in the lithium transition metal complex oxide.

In this case, by using an imide salt or a sulfonate as a magnesium salt (electrolyte salt), electrochemical substitution of magnesium atoms for the part of lithium atoms in 3b sites is allowed.

As imide salts, $((CF_3SO_2)_2N)_2Mg$, $((C_2F_5SO_2)_2N)_2Mg$, $((C_4F_9SO_2)(CF_3SO_2)N)_2Mg$, $((C_6F_5SO_2)(CF_3SO_2)N)_2Mg$, $((C_8F_{17}SO_2)(CF_3SO_2)N)_2Mg$, $((CF_3CH_2OSO_2)_2N)_2Mg$, $((CF_3CF_2CH_2OSO_2)_2N)_2Mg$, $((HCF_2CF_2CH_2OSO_2)_2N)_2Mg$, $(((CF_3)_2CHOSO_2)_2N)_2Mg$, or the like may be used.

As sulfonate, $(CF_3SO_3)_2Mg$, $(CH_3SO_3)_2Mg$, $(C_4F_9SO_3)_2Mg$, $(C_6F_5SO_3)_2Mg$, $(C_6H_5SO_3)_2Mg$, $(C_8F_{17}SO_3)_2Mg$, or the like may be used.

One of the above-mentioned imide salts and sulfonates may be used, or at least two of them may be combined for use.

It is noted that the electrolyte salt is dissolved for use in a non-aqueous solvent (organic solvent) at a concentration of 0.1 to 1.5 M, preferably at a concentration of 0.5 to 1.5 M.

In addition, as anon-aqueous electrolyte solvent (organic solvent) used at the time of electrochemical substitution of magnesium atoms (Mg) for lithium atoms (Li), non-aqueous solvents generally used for batteries may be used. For example, cyclic ester carbonate, chain ester carbonate, esters, cyclic ethers, chain ethers, nitriles, amides, or the like may be used.

Cyclic ester carbonates may be illustrated by ethylene carbonate, propylene carbonate, butylene carbonate, and the like. Substances obtained by fluorinating part of or all of hydrogen atoms in the above-mentioned substances can also be used, such as trifluoropropylene carbonate and fluoroethyl carbonate.

Chain ester carbonates may be illustrated by dimethyl carbonate, ethylmethyl carbonate, diethyl carbonate, methyl propyl carbonate, ethyl propyl carbonate, methyl isopropyl carbonate, and the like, and substances obtained by fluorinating part of or all of hydrogen atoms in the above-mentioned substances can also be used.

Esters may be illustrated by methyl acetate, ethyl acetate, propyl acetate, methyl propionate, ethyl propionate, γ-butyrolactone, and the like.

Cyclic ethers may be illustrated by 1,3-dioxolane, 4-methyl-1,3-dioxolane, tetrahydrofuran, 2-methyl tetrahydrofuran, propylene oxide, 1,2-butylene oxide, 1,4-dioxiane, 1,3,5-trioxane, furan, 2-methy furan, 1,8-cineole, crown ether, and the like.

Chain ethers may be illustrated by 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentylphenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl, and the like.

Nitriles may be illustrated by acetonitrile and the like, and amides may be illustrated by dimethylformamide and the like.

The positive electrode active material formed by the method in the present embodiment has a stable rock-salt structure. Accordingly, a phase change hardly occurs on insertion and release of excessive lithium atoms. As a result, the capacity of a positive electrode active material can be increased, leading to improved capacity of a non-aqueous secondary battery.

EXAMPLE 1

In Example 1, the test cell shown in FIG. 2 was prepared to measure the discharge capacity of lithium cobaltate in which magnesium atoms are substituted for part of lithium atoms.

As shown in FIG. 2, a positive electrode 1, a negative electrode 2, and a reference electrode 3 are disposed in a cell vessel 10. A separator 4 is inserted between the positive electrode 1 and negative electrode 2. A non-aqueous electrolyte 5 is poured into the cell vessel 10.

In Example 1, lithium cobaltate (LiCoO2), a conducting agent made of carbon, and a binder made of polyvinilidene di fluoride (PVdF) were mixed at a weight ratio of 90:5:5, respectively, and N-methyl-2-pyrrolidone was added to the mixture to prepare a slurry. This slurry was applied to a current collector made of aluminum foil, forming the positive electrode 1. Metallic lithium was used for the negative electrode 2 and reference electrode 3.

A non-aqueous electrolyte (non-aqueous electrolyte including a lithium salt) including lithium hexafluorophosphate ($LiPF_6$) as a solute dissolved at a ratio of 1 mol/l in a mixed solvent of ethylene carbonate (EC) and diethyl carbonate (DEC) (volume ratio of EC:DEC=50:50); and a non-aqueous electrolyte (non-aqueous electrolyte including a magnesium salt) including magnesium bis(trifluoromethyl sulfonyl) imide $(((CF_3SO_2)_2N)_2Mg)$ dissolved as a solute at a ratio of 1 mol/l in a solvent of γ-butyrolactone $((CH_2)_3OCO)$ were used.

The test cell thus prepared was discharged at a constant current by the following manner to evaluate the positive electrode active material. Table 1 shows non-aqueous electrolyte and charge and discharge conditions. Moreover, FIG. 3 shows the measurement results of discharge curves of lithium cobaltate before and after substitution of magnesium atoms for lithium atoms.

TABLE 1

| cycle number | charge and discharge conditions | non-aqueous electrolyte | capacity mAh/g | current density mA/cm² |
| --- | --- | --- | --- | --- |
| first cycle | charge | LiPF₆ EC/DEC | 120 | 1 |
|  | discharge | LiPF₆ EC/DEC | 110 | 1 |
| second cycle | charge | LiPF₆ EC/DEC | 150 | 1 |
|  | discharge | Mg(TFSI)₂ γ-BL | 60 | 0.025 |
|  | discharge | LiPF₆ EC/DEC | 124 | 0.025 |
| third cycle | charge | LiPF₆ EC/DEC | 135 | 0.05 |
|  | discharge | LiPF₆ EC/DEC | 136 | 0.05 |

In FIG. 1, γ-BL denotes γ-butyrolactone, and Mg (TFSI)$_2$ denotes magnesium bis(trifluoromethyl sulfonyl) imide.

First, in the first cycle, the above-mentioned non-aqueous electrolyte including a lithium salt is poured into the cell vessel 10. The test cell was charged, and then discharged. The current density during charge and discharge was set to 1 mA/cm$^2$. In this case, the charge capacity was 120 mAh/g, and the discharge capacity was 110 mAh/g.

Then, in the second cycle, the test cell was charged while the above-mentioned non-aqueous electrolyte including a lithium salt is held in the cell vessel 10. This caused extraction of lithium atoms (Li) from the lithium cobaltate forming the positive electrode active material. The current density during charge was 1 mA/cm$^2$.

After that, the non-aqueous electrolyte in the cell vessel 10 was replaced with the above-mentioned non-aqueous electrolyte including a magnesium salt, and the test cell was discharged. This caused insertion of magnesium atoms (Mg) into the lithium cobaltate forming the positive electrode active material, and the magnesium atoms were substituted for part of lithium atoms (Li). In this case, the current density during discharge was 0.025 mA/cm$^2$.

Subsequently, the electrolyte in the cell vessel 10 was replaced with the above-mentioned non-aqueous electrolyte including a lithium salt, and the test cell was discharged. The current density during discharge was 0.025 mA/cm$^2$. In this case, the discharge capacity was 124 mAh/g.

Further, in the third cycle, the test cell was charged while the above-mentioned non-aqueous electrolyte including a lithium salt is held in the cell vessel 10. The current density during discharge was 0.05 mA/cm$^2$. In this case, the charge capacity was 135 mAh/g.

The test cell was subsequently discharged. The current density during discharge was 0.05 mA/cm$^2$. In this case, the discharge capacity was 136 mAh/g.

As a result, the extraction of lithium atoms from the lithium cobaltate and substitution of magnesium atoms for the part of lithium atoms improved the capacity by 123%.

EXAMPLE 2

In Example 2, a structural change in lithium cobaltate before and after substitution of magnesium atoms (Mg) for part of lithium atoms (Li) was confirmed by XRD (X-ray diffraction) measurement.

In the XRD measurement, measurements were made on a range of 2 θ from 10 to 80 degrees with a scanning rate set to 1 degree/min., using CU (40 kV, 40 mA) as a source.

Figure 4:
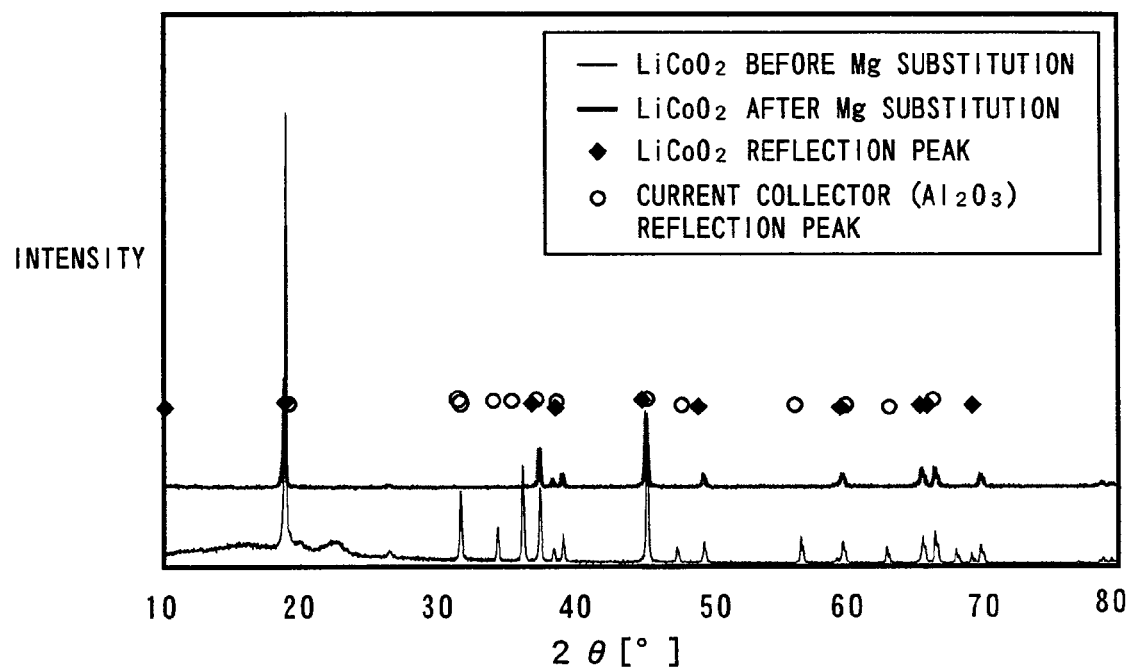
FIG. 4 is a diagram showing the measurement results of XRD patterns of a positive electrode before and after substitution of magnesium atoms for lithium atoms.

FIG. 4 shows the measurement results of XRD patterns of the positive electrode before and after substitution of magnesium atoms for lithium atoms.

In FIG. 4, thin solid line below represents an XRD pattern before substitution of magnesium atoms for lithium atoms, and thick solid line above represents an XRD pattern after substitution of magnesium atoms for lithium atoms.

Black rhombuses represent reflection peaks from lithium cobaltate (LiCoO$_2$), and white circles represent reflection peaks from Al$_2$O$_3$. The reflection peaks from Al$_2$O$_3$ were derived from an aluminum oxide on the surface of the current collector.

As shown in FIG. 4, no change exists between the reflection peaks from lithium CoO$_2$ before substitution of magnesium atoms for lithium atoms and the reflection peaks from lithium CoO$_2$ after substitution of magnesium atoms for lithium atoms. This fact shows that the substitution of magnesium atoms for lithium atoms caused no phase change in LiCoO$_2$.

As can be seen from this Example, substitution of magnesium atoms (Mg) for part of lithium atoms (Li) in LiCoO$_2$ causes no structural change in LiCoO$_2$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a positive electrode active material comprising the step of electrochemically substituting magnesium for part of lithium in an oxide having a layered rock-salt structure containing lithium, wherein
said step of substituting includes the steps of:
preparing a cell in which a negative electrode and a positive electrode including said oxide are disposed in a non-aqueous electrolyte including a lithium salt;
extracting said part of lithium in said oxide by discharging said cell;
after extracting said part of lithium in said oxide, replacing the non-aqueous electrolyte including a lithium salt with a non-aqueous electrolyte including a magnesium salt; and
after said replacement of non-aqueous electrolyte, inserting magnesium into said oxide by discharging said cell.

2. The method of manufacturing a positive electrode active material according to claim 1, wherein
said oxide includes a lithium transition metal complex oxide, and said transition metal includes at least one type of metal selected from the group consisting of cobalt, manganese, iron, and nickel.

3. The method of manufacturing a positive electrode active material according to claim 1, wherein said oxide includes lithium cobaltate.

* * * * *